United States Patent Office 2,849,162
Patented Aug. 26, 1958

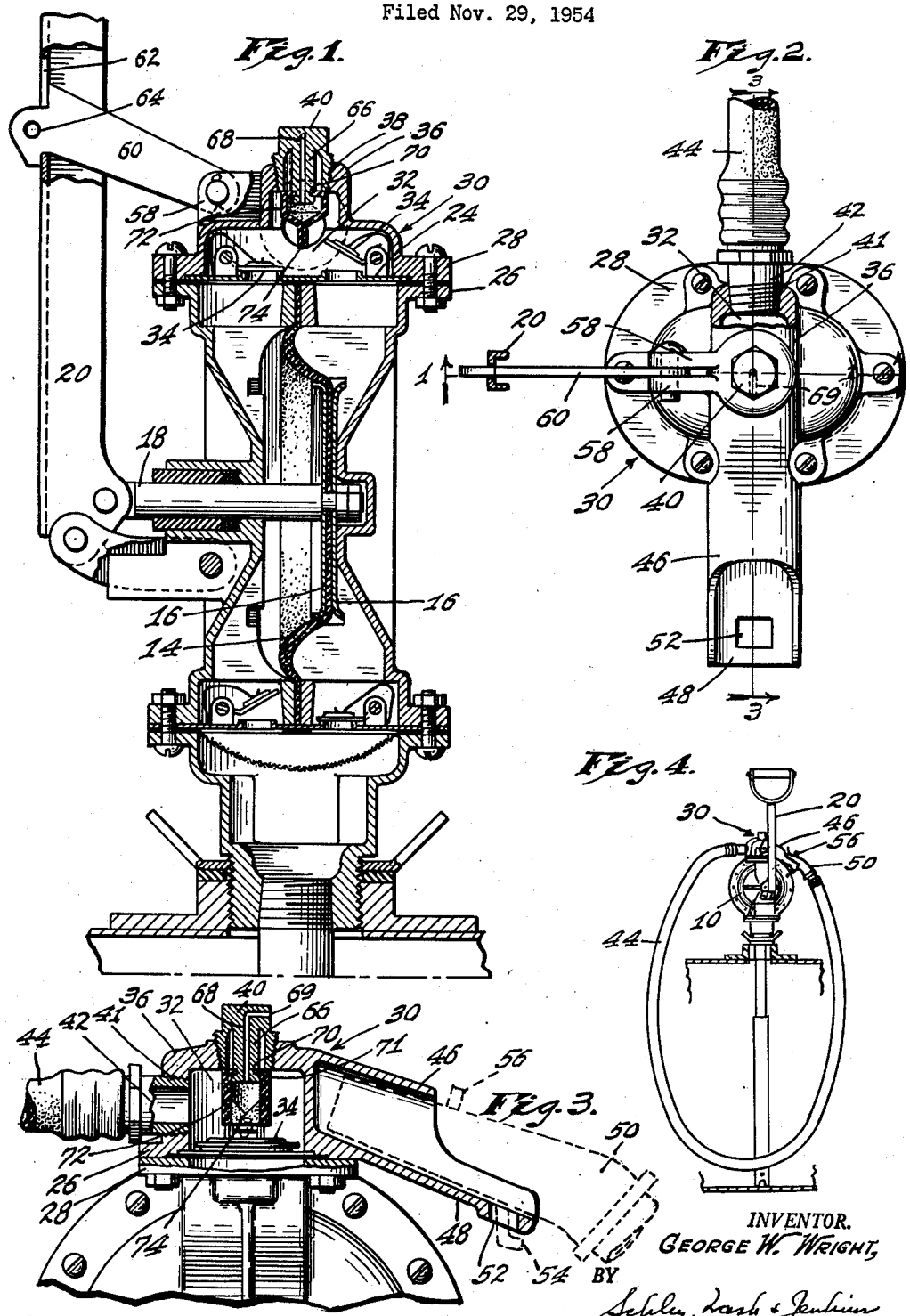

2,849,162

PUMP-DISCHARGE FITTING

George W. Wright, Yoder, Ind., assignor to Tokheim Corporation, Fort Wayne, Ind., a corporation of Indiana Application November 29, 1954, Serial No. 471,550

5 Claims. (Cl. 222—375)

This invention relates to a pump-discharge fitting, adapted especially for combination with a pump of the type shown in my prior Patent No. 2,685,304, and to the combination of such fitting with a hose and with a pump.

It is an object of the invention to provide an outlet fitting which will connect a dispensing hose to a pump of the aforesaid type in a compact and efficient arrangement, and which will provide a support for the nozzle end of the hose when not in use, to support the hose in a safe and protective storage position. It is a further object of the invention to provide such a compact outlet fitting which is interrelated to the valve plate assembly shown in the aforesaid patent and especially to a valve plate of the type shown in my co-pending application Serial No. 471,549, filed November 29, 1954. It is a further object of the invention to provide such a compact fitting which provides a vacuum-breaking valve. It is a further object of the invention to provide a compact hose fitting which has a wide adaptability to suit a variety of other installations, such as those which may be made by attaching outlet piping or a spout in one or the other or both of the outlet opening and the vacuum-breaker valve plug opening.

A main casing of a pump of the type referred to terminates at the top in a flat flanged face which receives a valve plate providing valves for both of two opposite displacement chambers of the pump. The outlet fitting of the present invention clamps against that flanged face, and retains the valve plate in place. Normally, the valve-plate receiving face is elongated in a direction normal to the central plane of the generally circular casing of the pump. The outlet fitting of the invention is similarly elongated in a horizontal direction, and forms a chamber which provides clearance for movement of the valves. The top of that chamber normally lies at the highest point of the fluid dispensing line, and is arranged to receive a vacuum-breaker valve, preferably removably inserted as a plug in a standard pipe-thread opening. One side-wall of the elongated chamber is provided with an outlet connection for the fixed end of a dispensing hose. At the opposite side wall the fitting forms a hanger for the nozzle at the free end of the hose. The hose connector and the hose-nozzle hanger extend in opposite directions from the sides of the fitting, in substantially the same plane as the body of the pump, to support the hose in a storage loop when not in use. The arrangement compactly positions the hose supports in relationship to the pump body and in non-interfering relation with pump operation.

The accompanying drawing illustrates the invention. In such drawing:

Fig. 1 is a vertical section of a pump assembly embodying the invention;

Fig. 2 is a top plan view of the pump assembly shown in Fig. 1, with parts broken away to show the hose connection;

Fig. 3 is a front view of the pump assembly, with parts broken away to show a vertical section of the outlet fitting; and Fig. 4 is a sketch showing the arrangement of the pump and the hose in combination with a suction stub mounted in a bunghole fitting of a tank.

The pump shown in the drawings comprises a front casing 10 and a rear casing 12 clamped together against the opposite faces of the rim of a diaphragm 14. The central portion of the diaphragm is clamped between a pair of plates 16 to form a reciprocable piston carried by a pump rod 18 adapted to be reciprocated by a manual handle 20. The assembled pump casing terminates at the bottom in a flanged face, which is shown connected to a connector mounting of the type set forth in my co-pending application Serial No. 471,549, filed November 29, 1954.

The upper flanged end of the assembled casing forms a flat face for the reception of an outlet valve plate 24 which is clamped at its edges between the flange 26 of the assembled pump casing and the flange 28 of the outlet fitting 30. The outlet fitting 30 is of elongated oval shape in plan, to mate with the corresponding shape of the upper end of the assembled casings. At the inner edge of the flange 28 of the fitting 30, the fitting walls rise and curve inwardly to define a valve chamber 32, which is likewise of elongated oval shape to provide clearance for the two spaced valves 34 carried by the valve plate for the opposite displacement chambers of the pump. At the top, the walls of the chamber 32 join an upward and outward extending rib 36 which extends generally transversely of the elongated fitting and in the central plane of the pump body. At the top, such rib is provided with an internally threaded opening 38 for a suction-breaking valve plug 40, such opening desirably being of the same size as the outlet opening 41 mentioned below.

At the far side of the fitting as shown in Fig. 1, and at the left side of the assembly as viewed from the front and as shown in Figs. 3 and 4, the rib 36 reinforces the fitting wall about an internally pipe-threaded outlet opening 41 which is adapted to receive the connecting nipple 42 of a flexible hose 44. At the opposite side of the fitting 30, the rib forms a hollow nozzle receptacle and hanger 46, closed at its inner end by the side-wall of the valve-clearance chamber. The receptacle 46 is generally circular in cross section, and its lower wall 48 extends outwardly farther than its upper wall, to support a nozzle 50 as shown in dotted lines in Fig. 3. The lower wall of the hanger is desirably provided with an opening 52 to receive a retaining hook 54 carried by the nozzle 50. The upper side of the nozzle 50 may carry a lug 56 for limiting the insertion of the nozzle into a tank opening or for holding the nozzle in the bunghole of a tank, and the shortened top wall of the receptacle clears that lug. At the front of the rib 36, to the left in Fig. 1, a pair of ribs 58 extend forwardly to provide a pivot support for a handle lock link 60 adapted to be received through a slot 62 in the web of the handle 20 and with its free end provided with an opening 64 for a padlock to lock the handle against use.

The suction-breaking valve plug 40 comprises an externally threaded plug adapted to be received in either the top opening 38 or the side opening 41. The plug has a central stem 66 in which is bored a vent hole 68 which opens through the bottom of the stem and is connected at the top to a cross hole 69 which communicates with the exterior of the plug. The lower end of the stem is provided with an annular notch 70 to receive in sealing engagement the inwardly extending edge of the flange 71 of a valve body 72. The valve body 72 is molded of flexible rubber or other elastomer. Its upper portion is generally cylindrical, with the inwardly directed flange 71 at the top as a reinforcement and mounting support. The cylindrical portion joins an inverted, conical wall from which depend a pair of diametrically extending flat walls 74. Such flat walls normally lie in face-to-face relationship and are pressed together by any pressure within the valve chamber 32. Upon a reduction of pressure in such valve chamber 32, however, the flat walls 74 are spread apart and air is admitted between them from the vent hole 68 to the interior of the valve chamber 32. The valve plug 40 and the valve body 72 which it carries thus forms a positive but readily-openable check valve which opens inwardly to admit air to the valve chamber 32 to break any suction or siphoning which would otherwise interfere with draining of the hose 44.

The new outlet fitting and its combination in the assembly provides an exceedingly compact arrangement for connecting and supporting a hose from a pump of the type referred to. It is completely self-contained and requires no pipe connections or accessory fittings. The nozzle receiving hanger lies close against the body of the pump and in substantially the same plane therewith, which with the symmetrical relationship of the hose connector and nozzle hanger disposes the hose in a convenient and relaxed storage loop from the pump itself. The fitting provides both top and side outlet openings and readily adapts the assembly for other dispensing connections and arrangements. Spouts or other dispensing conduits may be connected directly to the pump at either or both of the top and side openings, and the valve plug, being effective as a closure in any position, may be received in either of such openings, as a closure or as a valve or both.

I claim as my invention:

1. An outlet fitting for a discharge device such as a hand pump having a casing terminating at the top in a flanged face, said fitting comprising a flanged body adapted to be received and retained on said face, an outwardly directed outlet in one side wall of said body and adapted to receive the connected end of a flexible hose, a hose nozzle hanger extending outward from the opposite side wall and adapted to receive the nozzle of said flexible hose in supporting relation, said outlet and hanger cooperating to support the flexible hose in a depending loop therefrom.

2. An outlet fitting as set forth in claim 1 in which a threaded top opening is formed in said flanged body and a suction-breaking valve plug is removably received in said opening.

3. An outlet fitting as set forth in claim 2 in which said outlet is formed as a threaded opening and said valve plug is interchangeably receivable in said outlet opening and said top opening.

4. A pump assembly, comprising a generally circular pump casing and pumping means therein, means to mount the casing with its central plane in an upright position, an outlet valve at the top of the casing, an outlet fitting enclosig the valve, a hose-receiving outlet in said fitting extending generally tangentially of said circular pump casing in one direction substantially in said central plane, and a nozzle receptacle on said fitting and extending generally tangentially of said circular pump casing in the opposite direction in said central plane, and a vacuum-breaking valve in the top of said fitting, said outlet and nozzle receptacle being adapted to support a hose in a storage loop with its ends substantially tangent to the circular pump casing.

5. A pump assembly, comprising a generally circular pump casing and pumping means therein, means to mount the casing with its central plane in an upright position, means forming an outlet valve chamber at the top of the casing and providing clearance space for a valve mounted therein, a hose-receiving outlet in a wall of said outlet valve chamber extending generally tangentially of said circular pump casing, a hose connected to said outlet to hang in a loop from said pump casing with its connected end substantially tangent thereto, and a nozzle support carried by said casing for supporting the free end of the hose.

References Cited in the file of this patent

UNITED STATES PATENTS

| Number | Name | Date |
|---|---|---|
| 135,320 | Camp | Jan. 28, 1873 |
| 530,663 | Shaw | Dec. 11, 1894 |
| 679,201 | Allison | July 23, 1901 |
| 1,907,673 | Rockwell | May 9, 1933 |
| 1,907,763 | England | May 9, 1933 |
| 1,930,107 | Rang | Oct. 10, 1933 |
| 2,240,979 | Byers | May 6, 1941 |
| 2,417,968 | Browne | Mar. 25, 1947 |
| 2,671,409 | Wright | Mar. 9, 1954 |
| 2,685,304 | Wright | Aug. 3, 1954 |
| 2,704,620 | Perri et al. | Mar. 22, 1955 |